United States Patent [19]
Wallace et al.

[11] Patent Number: 6,070,687
[45] Date of Patent: Jun. 6, 2000

[54] VEHICLE OCCUPANT RESTRAINT DEVICE, SYSTEM, AND METHOD HAVING AN ANTI-THEFT FEATURE

[75] Inventors: Jon Kelly Wallace, Redford; Russell J. Lynch, West Bloomfield, both of Mich.

[73] Assignee: TRW Inc., Lyndhurst, Ohio

[21] Appl. No.: 09/018,429

[22] Filed: Feb. 4, 1998

[51] Int. Cl.⁷ .................................................. B60R 25/10
[52] U.S. Cl. .......................................... 180/287; 280/735
[58] Field of Search ............................. 180/287; 280/735

[56] References Cited

U.S. PATENT DOCUMENTS

| | | | |
|---|---|---|---|
| 4,291,237 | 9/1981 | Kitano ...................................... | 180/287 |
| 5,091,856 | 2/1992 | Hasegawa et al. ...................... | 180/287 |
| 5,696,482 | 12/1997 | Kaiser et al. ............................ | 180/287 |
| 5,705,976 | 1/1998 | Howard ................................... | 340/426 |
| 5,831,344 | 11/1998 | Rose, Sr. ................................. | 180/287 |

OTHER PUBLICATIONS

A SAE publication entitled "Bus System for Wiring Actuators of Restraint Systems", by Bauer et al., and believed to have been published in 1996.

*Primary Examiner*—Kenneth R. Rice
*Attorney, Agent, or Firm*—Tarolli, Sundheim, Covell, Tummino & Szabo L.L.P.

[57] ABSTRACT

A vehicle occupant restraint system (10) has an anti-theft feature. A restraint device (e.g., 12) of the system (10) is actuatable for restraining a vehicle occupant. The restraint device (12) has an identity associated with the system (10). A central controller (40) communicates with the restraint device (12) and controls actuation of the restraint device. The central controller (40) has a theft deterrent function (52) for discerning the identity of the restraint device (12) and for determining whether the identity of the restraint device corresponds to the system (10). The theft deterrent function (52) provides a signal (60) indicative of the determination.

38 Claims, 3 Drawing Sheets

6,070,687

VEHICLE OCCUPANT RESTRAINT DEVICE, SYSTEM, AND METHOD HAVING AN ANTI-THEFT FEATURE

TECHNICAL FIELD

The present invention is generally directed to an occupant restraint system for a motor vehicle, and is particularly directed to an occupant restraint system in which theft of air bag modules and the like is deterred. The invention is useful for occupant restraint systems in which theft of the air bag modules is likely.

BACKGROUND OF THE INVENTION

Occupant restraint systems installed in modern motor vehicles include one or more actuatable restraint devices for restraining an occupant. Examples of such restraint devices include an air bag, a knee bolster, and a seat belt pretensioner. The restraint system also includes one or more sensor devices for sensing vehicle characteristics and/or occupant characteristics. The systems are typically controlled from a central control module.

The air bags used in such systems provide tempting targets for thieves because the air bags are modular, the air bag modules are easily removed from the vehicle, and the air bag modules are relatively expensive components. There is a demand for replacement modules on the open market because the air bags are designed as a "use once" component and must be replaced if they are deployed as a result of an accident. Other system components, particularly other "use once" components such as seat belt pretensioners, are theft targets for similar reasons.

SUMMARY OF THE INVENTION

In accordance with one aspect, the present invention provides a vehicle system having a plurality of components. The system includes control means for communicating with each of the components and for controlling actuation of the system in response thereto. The control means has means to discern an identity of each of the components, and means for determining whether the identity of each of the components conforms to a predetermined identification criterion. The control means provides a signal indicative of the determination.

In accordance with another aspect, the present invention provides a vehicle occupant restraint system having an anti-theft feature. The system includes a restraint device actuatable for restraining a vehicle occupant. The restraint device has an identity associated with the system. The system includes control means for communicating with the restraint device and for controlling actuation of the restraint device. The control means has means to discern the identity of the restraint device, and means for determining from the identity whether the restraint device belongs to the system and providing a signal indicative thereof.

In accordance with another aspect, the present invention provides a restraint device for a vehicle occupant restraint system having an anti-theft feature. The restraint device includes actuatable restraint means actuatable for helping to restrain a vehicle occupant. The restraint device includes initiator means for initiating the actuatable restraint means. Identification retainer means of the restraint device retain an identity of the restraint device associated with the system. Communication means of the restraint device communicate with a central controller of the system. The communication means includes means for communicating to cause the initiator to initiate the actuatable means. The communication means also includes means for communicating to provide the identity from the identification retainer means to the central controller for determination of whether the identity of the restraint device corresponds to the system.

In accordance with another aspect, the present invention provides a method for discouraging theft of a component of a vehicle system having a plurality of components. The method includes communicating with each of the components, and controlling actuation of the system in response to the communication. The identity of each of the components is discerned. The method also includes determining whether the identity of each of the components corresponds to predetermined identification information, and providing a signal indicative of the determination.

In accordance with another aspect, the present invention provides a method for preventing theft of a restraint device. The restraint device is actuatable for restraint of a vehicle occupant and is part of a vehicle occupant restraint system that has a control means for communicating with the restraint device and for controlling actuation of the restraint device. The restraint device is provided with an identity associated with the system. The identity of the restraint device is discerned by the control means, via communication between the control means and the restraint device. Whether the identity of the restraint device corresponds to the system is determined and a signal indicative thereof is provided.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
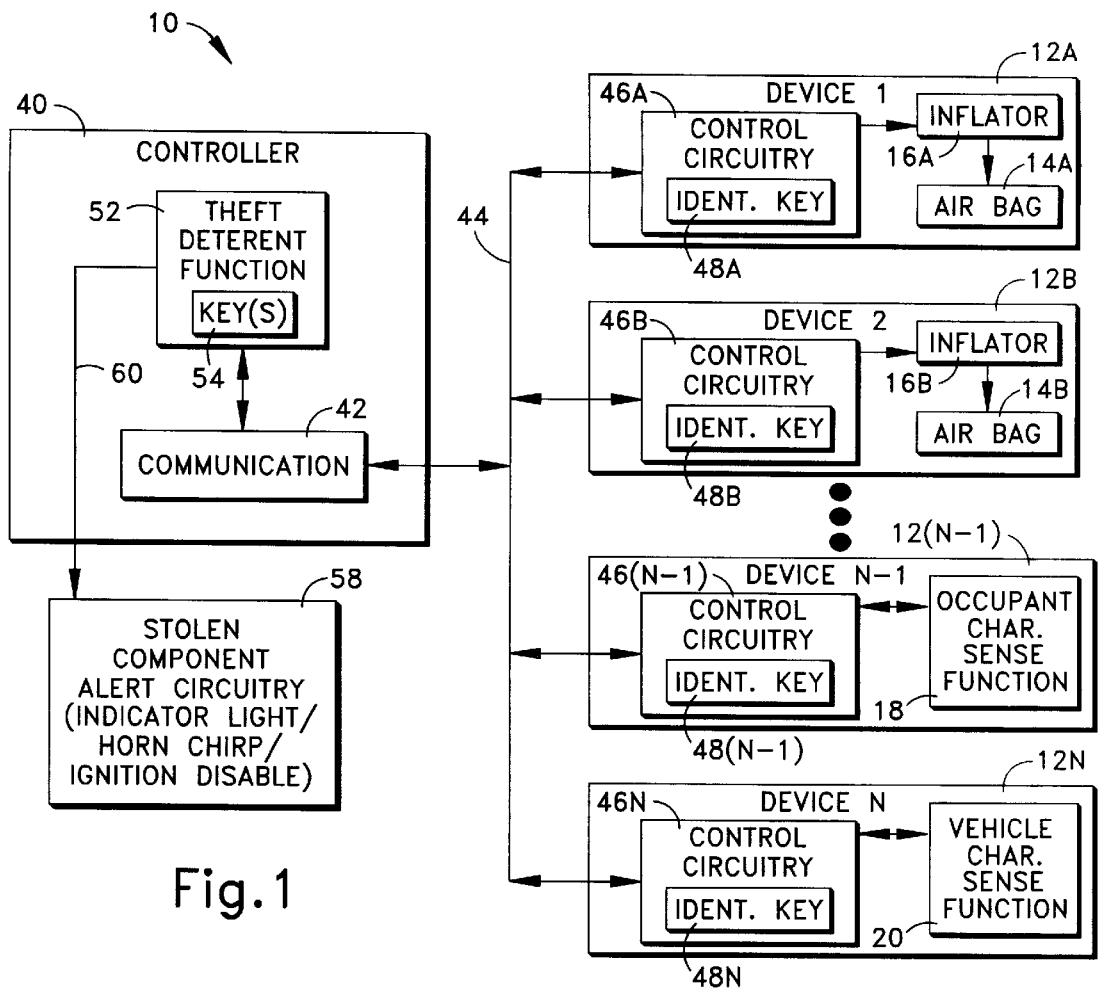
FIG. 1 is a schematic illustration of an apparatus in accordance with the present invention.

FIG. 1 is a representation of an occupant restraint system 10 incorporating the present invention. The system 10 includes a plurality of restraint system devices 12. Any number (e.g., N) of restraint system devices 12 may be provided within the restraint system 10. The individual devices 12 are identified in the Figures via the use of alphabetic suffixes (e.g., "A" and "B"). Herein, the restraint system devices are referred to collectively and/or generically as devices 12 (i.e., for discussions that are applicable to any or all of the devices in the restraint system 10). The devices 12 are referred to using their alphabetic suffixes for discussions that are specific to that particular device. Also, it should be appreciated that the restraint system devices 12 of the illustrated example have structural elements that are identified by numbers with corresponding alphabetic suffixes. Herein, the alphabetic suffixes are sometimes omitted for generic discussions, i.e., applicable to all of the structure identified by particular reference numeral.

The restraint system devices 12 may be comprised of any combination of devices or components. For example, some of the restraint system devices 12 may be actuatable occupant restraint devices (e.g., devices 1 and 2 of FIG. 1) for restraining a vehicle occupant. Examples of such occupant restraint devices include an air bag, a knee bolster, a seat belt lock, a seat belt pretensioner, and a D-ring adjuster. For the purpose of illustration of the invention and not for the purpose of limitation, the example shown in FIG. 1 has occupant restraint devices 12A and 12B, which are air bag restraint devices.

Each occupant restraint device (e.g., 12A) includes an associated inflatable restraint 14, commonly referred to as an air bag. Each air bag (e.g., 14A) is stored in a folded condition within the respective restraint device 12 in a manner well known in the art. For each occupant restraint device (e.g., 12A), a source 16 of inflation fluid (e.g., nitrogen gas) is provided to inflate the associated air bag 14. The source 16 of inflation fluid is commonly referred to as an inflator, and includes a stored quantity of pressurized inflation fluid and/or an inflation fluid generating material. The restraint devices (e.g., 12A) are provided as modules that are readily replaceable.

The example shown in FIG. 1 contains two restraint system devices or components 12(N–1) and 12N that are sensor devices. Each sensor device (e.g., 12(N–1)) senses a characteristic that is used to determined whether a vehicle occupant is to be restrained and/or to determine a desired dynamic deployment profile of an occupant restraint device (e.g., 12A, 12B) for restraining the occupant. Examples of such sensor devices include a vehicle crash sensor, such an accelerometer, an occupant position sensor, such as an ultrasound or infrared sensor, and an occupant weight sensor, such as a pressure sensor. For the purpose of illustration only and not for the purpose of limitation, the sensor device 12(N–1) of FIG. 1 is an occupant characteristic sensor with an occupant characteristic sense function 18 (e.g., an ultrasound sensor), and the sensor device 12N of FIG. 1 is a vehicle characteristic sensor with a vehicle characteristic sense function 20 (e.g., an accelerometer).

Figure 2:
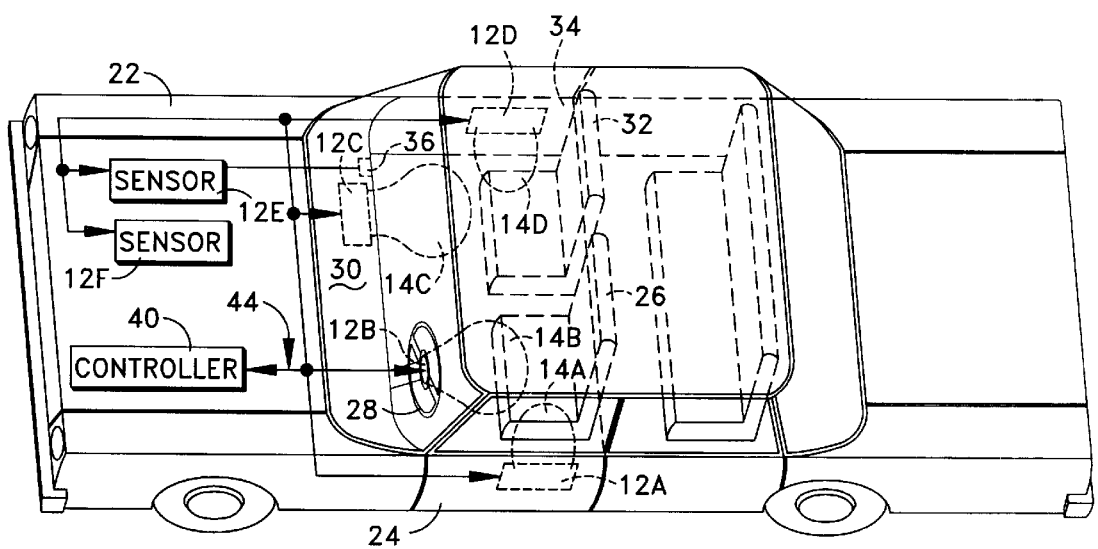
FIG. 2 is a schematic illustration of a vehicle, which includes an example of the present invention.

As mentioned above, the restraint system 10 may have any number of restraint system devices or components 12. An example of a restraint system having four restraint devices and two sensor devices is shown within a vehicle 22 in FIG. 2. In this illustrated example, a first occupant restraint device 12A is a vehicle side impact air bag restraint device mounted in a driver's side door 24. Upon inflation of the air bag 14A of the driver's side door mounted restraint device 12A, the air bag 14A extends at a side of a driver's seat 26 of the vehicle 22. A second one of the devices is a steering wheel-mounted restraint device 12B located within a hub of the vehicle's steering wheel 28. Upon inflation of the air bag 14B of the steering wheel-mounted restraint device 12B, the air bag 14B inflates at a location in front of the driver's seat 26, with respect to the fore-to-aft axis of the vehicle 22.

A third one of the restraint devices (i.e., 12C) is mounted in a passenger side of a dashboard 30 of the vehicle 22. The air bag 14C of the dashboard-mounted restraint device 12C inflates at a location in front of a front passenger seat 32 of the vehicle 22. A fourth one of the restraint devices is a door-mounted restraint device 12D located in a passenger door 34 of the vehicle 22. The air bag 14D of the door-mounted restraint device 12D inflates at a location to the side of the passenger seat 32.

The first of two illustrated sensor devices 12E is an ultrasound sensor (e.g., an ultrasonic transducer 36 and associated drive/monitor circuitry) for sensing the presence and position of a front seat passenger. The second sensor device 12F is an accelerometer for sensing vehicle crash acceleration in the fore-to-aft direction. It will be appreciated that additional and/or different actuatable occupant restraint devices and that additional and/or different sensor devices can be included within the restraint system 10.

Referring now again to FIG. 1, the system 10 is a distributed system that has a central controller 40. The controller 40 may be any suitable device, such as a microcomputer, for controlling operation of the system 10. A communication portion 42 of the controller 40 is connected to a communication interconnection 44. The communication interconnection 44 may have any suitable structure for conveying signals. In one embodiment, the communication interconnection 44 includes a communication bus. In another embodiment, the communication interconnection 44 is a two or three wire system for serial communication. The communication that occurs on the communication interconnection 44 is duplexed.

Also, in accordance with one preferred embodiment, the central controller 40, via its communication portion 42, supplies electrical energy to the communication interconnection 44 for use by the devices 12. Thus, the central controller 40 provides power to the devices 12. Any known arrangement for supplying power, in addition to communication signals, via the communication interconnection 44 may be employed.

Each restraint system device 12 includes control circuitry 46 connected to the communication interconnection 44. The control circuitry 46 of each restraint system device 12 functions to communicate with the central controller 40 and to control operation of the respective device. For example, with regard to the restraint device 12A, the control circuitry 46A controls actuation of the inflator 16A. Specifically, within the control circuitry 46 of each of the occupant restraint devices 12A and 12B is an igniter circuit. The igniter circuit contains a squib that is electrically activatable to initiate flow of inflation fluid from the respective inflator 16. The igniter circuit, and squib, may be any known type. In one embodiment, the igniter circuit squib is comprised of a semi-conductor bridge ("SCB") circuit. The control circuitry 46 provides a signal to activate the squib based upon a command signal from the central controller 40.

With regard to the sensor device 12(N–1), the control circuitry 46(N–1) controls operation of the occupant characteristic sense function 18, and with regard to the sensor device 12N, the control circuitry 46N controls operation of the vehicle characteristic sense function 18. The central controller 40 provides command signals to the restraint devices and also receives signals containing sensory information from the control circuitry 46 of the sensor devices.

It should be noted that although the various restraint system devices 12 (i.e., restraint devices and sensor devices) may be different, each has similar control circuitry 46 with regard to communication. Specifically, the control circuitry 46 contains logic and memory circuitry, and is addressable and programmable. Within each device 12, the addressable aspect of the control circuitry 46 is provided such that the central controller 40 can direct communication signals to one or more specific devices and each device "knows" when a communication signal is directed to that particular device.

In accordance with the present invention, the restraint system 10 includes a theft deterrent feature. For each device 12, the control circuitry 46 includes a permanent storage function that holds an identification key 48. The identification key 48 is a security number or code that is not changeable, or at least not readily changeable, by unauthorized personnel (e.g., a car thief). Examples of identification keys 48 include an 8 or 16 bit word that is randomly assigned. Other examples of identification keys 48 include the vehicle serial number or a serial number assigned to all or part of the system 10.

In accordance with one embodiment of the present invention, all of the identification keys 48A–48N are identical, but uniquely associated with a specific system 10. The phrase "specific system 10" refers to the restraint system of a single vehicle 22, as opposed to the restraint systems of other vehicles. In accordance with another embodiment of the present invention, the identification keys 48A–48N are unique, in addition to being associated with a specific system 10. For the purpose of explanation of the disclosed example, the identification keys 48A–48N within the system 10 are unique.

It should be understood that the terminology of "unique" is intended to encompass "effectively unique." For example, during mass-production manufacture of the system 10, identification keys may be reused so long as the frequency of the reuse is limited and their combination with other devices 12 is by random assignment. For example, if the identification key 48 had n bits, then, on average, the same identification key would be repeated, during mass-production manufacture, every $2^n$th unit that is produced. If the identification key 48 had 8 bits, then, on average, the same identification key would be repeated every 256th unit that is produced.

Within each device 12, a memory portion of the control circuitry 46 provides the permanent, non-volatile storage of the identification number. In other words, the identification key 48 is stored in a read-only memory ("ROM"). Alternatively, a programmable read-only memory ("PROM"), an erasable read-only memory ("EPROM"), or an electronically erasable programmable read-only memory ("EEPROM") can be used. Further, the memory (e.g., ROM) may be a one time programmable ("OTP") memory. The storage devices are encoded or programmed by authorized personnel, preferably at the time of manufacture of the system 10.

As part of the theft deterrent feature of the system 10 in accordance with the present invention, the central controller 40 has a theft deterrent function 52. Identification keys 54 are held within a non-volatile storage device of the theft deterrent function 52. The identification keys 54 are not changeable, or at least not readily changeable, by unauthorized personnel. Also, the central controller 40 is constructed such that the structure that contains the identification keys 54 can not be removed, or at least not readily removed, from the controller 40 without disabling the controller.

The identification keys 54 correspond to the identification keys 48A–48N of the devices 12A–12N. The identity of the two sets of identification keys 48 and 54 is accomplished by any suitable means. For example, during manufacture, once the central controller 40 and devices 12 of a specific system 10 are grouped together (e.g., either before, during, or after installation in the vehicle 22), associated identification keys 48 are provided (e.g., programmed) to the respective devices 12 and the corresponding identification keys 54 are provided (e.g., programmed) to the theft deterrent function 52 of the controller 40. The provision of the keys 48 and 54 is via an external input, e.g., programmed by an authorized technician at the manufacturing facility. Further, one example method for providing the keys 48 and 54 to ROMs includes permanent physical alteration of a "blank" memory to install the particular, unique key.

As another example, the central controller 40 is provided with identification keys 54 and the devices are "unprogrammed" prior to assembly. Once the system 10 is assembled (e.g., the controller 40 and the devices 12 are installed into the vehicle), an initiation procedure is performed by the system. During the initiation procedure, the central controller 40 provides (e.g., programs) the unprogrammed devices 12 with associated identification keys 48.

A third example would include devices 12 that have individual specific identification keys that are programmed into the devices prior to assembly into the system 10. The theft deterrent function 52 includes a learn function that is actuatable only by authorized personnel upon initial assembly of the system. The learn function would query each device 12 for its identification key. Subsequently, the theft deterrent function 52 would only accept those keys that it previously learned.

During operation of the vehicle 22, the central controller 40 receives sensory input from the sensor devices (e.g., 12(N–1), 12N), and using the sensory input regarding the sensed characteristics, makes determinations regarding restraint module control (e.g., the central controller operates a crash algorithm). Also, a person of ordinary skill in art will appreciate that because the restraint devices (e.g., 12A, 12B) could have adjustable aspects that are adjustable to tailor deployment of the respective restraint device, information derived from such sensed occupant and vehicle characteristics could be used by the controller to determine adjustment of the deployment variable(s). Such adjustable deployment variables include timing, air bag dynamic profile, pressure, etc. The central controller 40 would control the adjustment of the deployment variable(s) accordingly. The communication/control between the central controller 40 and the devices 12 is along the communication interconnection 44.

At some point during each operation of the vehicle 22 (e.g., at ignition turn-on), the theft deterrent function 52 makes determinations as to whether each of the devices is apparently a stolen device. Specifically, the theft deterrent function 52, via the communication portion 42 and the communication interconnection 44, receives the identification keys 48A–48N from the devices 12A–12N. The identification keys 48 are compared to the keys 54. If the keys match, the system 10 determines that there are no stolen devices 12. If all of the keys do not match, the system 10 includes at least one device 12 or central controller 40 that is possibly stolen.

Figure 3:
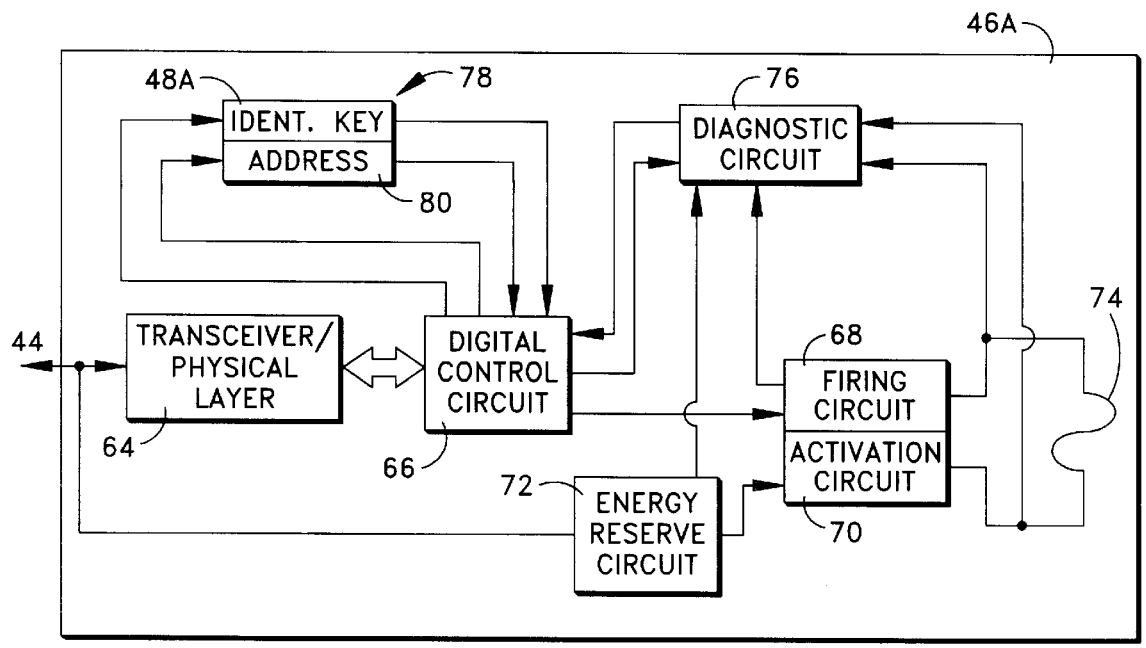
FIG. 3 is a schematic illustration of a control circuitry of a restraint device component shown in FIG. 1.

A schematic illustration of a preferred embodiment of the control circuitry 46A for the restraint device 12A is provided by FIG. 3. The control circuitry 46 for the other restraint device(s) (e.g., 12B) is similar. Within the control circuitry 46A, a transceiver/physical layer 64 is connected to the communication interconnection 44 for supplying signals to the communication interconnection and for receiving signals for the device 12A. A digital control circuit 66 is connected to the transceiver/physical layer 64. The digital control circuit 66 provides processing and control within the device 12A and communicates with the transceiver/physical layer 64.

A firing circuit 68 and an activation circuit 70 are connected with the digital control circuit 66 and are also connected to a squib 74. In response to one or more signals from the digital control circuit 66, sufficient electrical energy is applied to the squib 74 to ignite the squib. The electrical energy for igniting the squib 74 is provided from an energy reserve circuit 72, via the firing circuit 68/activation circuit 70. The energy reserve circuit 72 is connected to the communication interconnection 44, and receives energy from the central controller 40, via the communication interconnection.

A diagnostic circuit 76 is connected to the digital control circuit 66, the firing circuit 68/activation circuit 70, the squib 74, and the energy reserve circuit 72. Various tests are performed by the diagnostic circuit 76 upon the components of the device 12A. For example, the diagnostic circuit 76 tests the operability of the squib 74 by passing a non-igniting current through the squib. Results of the tests by the diagnostic circuit 76 are provided to the digital control circuit 66. Signals that contain the test result information are provided, via the transceiver/physical layer 64 and the communication interconnection 44, to the central controller 40.

A memory 78 of the control circuitry 46A of the device 12A contains the identification key 48A and also an address 80 of the device 12A. The memory 78 is connected to the digital control circuit 66. The memory 78 is accessed by the digital control circuit 66 to provide the address 80 to determine whether a communication signal received from the communication interconnection 44 is intended for the device 12A. Also, the address 80 is included in communication signals from the device 12A, such that the origin of the signal can be determined by the receiving component (i.e., the central controller 40).

In accordance with the present invention, the identification key 48A is accessed from the memory 78 in response to an inquiry signal from the central controller 40. The identification key 48A is sent, via signal on the communication interconnection 44, to the central controller 40 for comparison verification.

Figure 4:
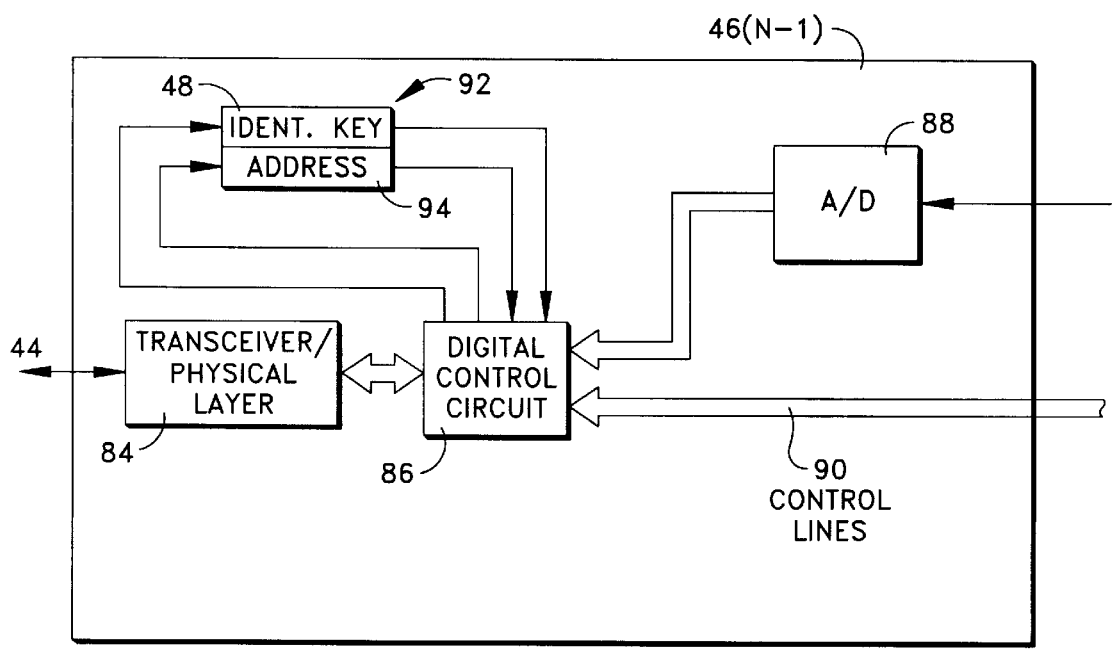
FIG. 4 is a schematic illustration of a control circuitry of a sensor device component shown in FIG. 1.

A schematic illustration of a preferred embodiment of the control circuitry 46(N-1) for the sensor device 12(N-1) is provided by FIG. 4. The control circuitry 46 for the other sensor device(s) (e.g., 12N) is similar. Within the control circuitry 46(N-1), a transceiver/physical layer 84 is connected to the communication interconnection 44 for supplying signals to the communication interconnection and for receiving signals for the device 12(N-1). A digital control circuit 86 is connected to the transceiver/physical layer 84. The digital control circuit 86 provide processing and control within the device 12A and communicates with the transceiver/physical layer 84.

An analog-to-digital (A/D) converter 88 is connected with the digital control circuit 86 and is also connected to receive an analog input regarding the sensed characteristic. The information derived from the sensed characteristic is processed by the digital control circuit 86. Signals that contain the sensed characteristic information are provided, via the transceiver/physical layer 84 and the communication interconnection 44, to the central controller 40. The digital control circuit 86 is also connected to control lines 90 for receiving various signals.

A memory 92 of the control circuitry 46(N-1) of the device 12A contains the identification key 48(N-1) and also an address 94 of the device 12(N-1). The memory 92 is connected to the digital control circuit 86. The memory 92 is accessed by the digital control circuit 86 to provide the address 94 to determine whether a communication signal received from the communication interconnection 44 is intended for the device 12(N-1). Also, the address 94 is included in communication signals from the device 12(N-1), such that the origin of the signal can be determined by the receiving component (i.e., the central controller 40).

In accordance with the present invention, the identification key 48(N-1) is accessed from the memory 92 in response to an inquiry signal from the central controller 40. The identification key 48(N-1) is sent, via signal on the communication interconnection 44, to the central controller 40 for comparison verification.

Figure 5:
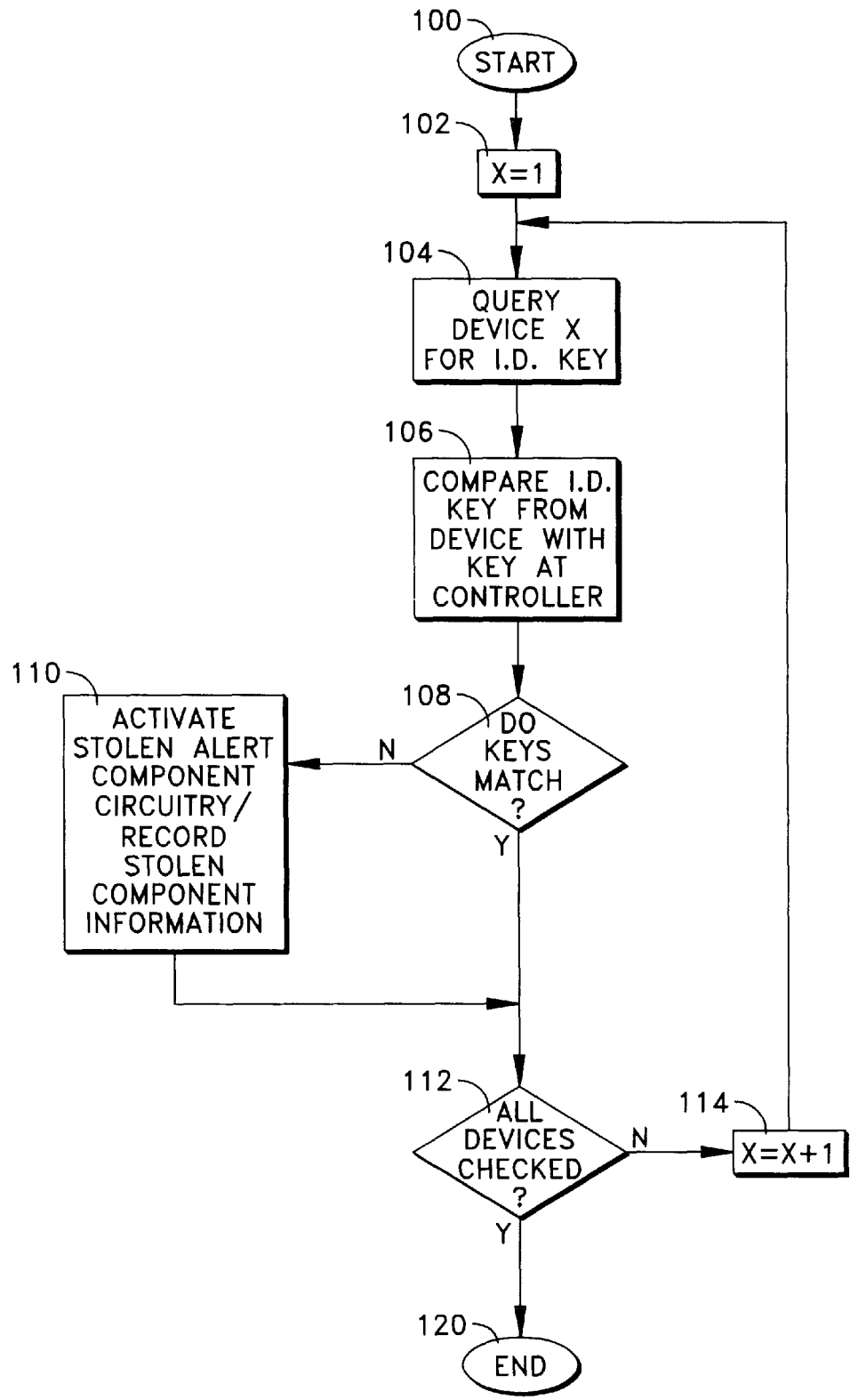
FIG. 5 is a flow chart for a process in accordance with the present invention for determining whether a stolen component is present in the system.

FIG. 5 shows an example of a process, in accordance with the present invention, performed by the theft deterrent function 52 of the central controller 40 to determine if a possible stolen component is present. The process starts at step 100 and proceeds to step 102 in which a variable X is set to an initial value 1. At step 104, the central controller 40 queries device X (the first time through the process, device 1) for its identification key 48. The query is done via a signal through the communication interconnection 44. The central controller 40 receives the identification key 48, and at step 106 compares the identification key 48 from the device X with the corresponding key 54 stored within the controller. At step 108, it is determined whether the keys match. If the determination at step 108 is negative (i.e., the keys do not match), the process proceeds to step 110, in which the signal 60 is provided to activate a stolen component alert circuitry 58. In addition, the non-matching identification key from the device is stored within the memory of the central controller 40. Once step 110 is complete, the process proceeds to step 112. If the determination at step 108 is affirmative (i.e., the keys match), the process proceeds to step 112.

At step 112, it is determined whether all of the devices 12 have been checked. If the determination at step 112 is negative (i.e., the controller is not yet done matching keys), the process proceeds to step 114 in which the variable X is incremented. After step 114, the process proceeds to step 104 in which the next device 12 is queried for its identification key. If the determination at step 112 is affirmative (i.e., the central controller 40 is done querying all of the devices 12, and all of the devices have provided matching identification keys), the process proceeds to step 120 and the query process terminates.

The process of FIG. 5 can be run at any suitable interval to make determinations as to the non-stolen status of the devices. For example, as mentioned above, the process may be run once at each instance in which the vehicle ignition is turned "ON" or periodically during vehicle operation.

Connected with the theft deterrent function 52 is the stolen component alert circuitry 58. The stolen component alert circuitry 58 may include any suitable circuitry that provides notice to the vehicle operator and/or authorities (e.g., the police, and/or automotive repair centers) that an apparently stolen device is present in the restraint system 10. The theft deterrent function 52 provides a signal 60 to the stolen component alert circuitry 58 to activate the stolen component alert circuitry upon a determination by the theft deterrent function that an apparently stolen component is present in the system 10.

Examples of stolen component alert circuitry 58 includes circuitry for lighting an indicator lamp on an instrument panel of the vehicle 22, circuitry for energizing a horn of the vehicle to emit a repeating chirp, circuitry for energizing headlights of the vehicle to repeatedly flash, and circuitry to disable the ignition of the vehicle. Also, the stolen component alert circuitry 58 may include means to store information about the components of the system 10 that are suspected of being stolen (e.g., non-matching identification numbers). It is even contemplated that all or part of the restraint system can be disabled.

If it becomes necessary to replace a device 12 (e.g., after a deployment), the vehicle 12 would be taken to an authorized service facility. Replacement procedures would be dependent upon the format used to initially provide (i.e., program) the devices 12 and the central controller 40 with the identification keys 48 and 54. In the example in which the devices 12 are provided (programmed) with an identification key by a technician, the authorized technician can provide an initially unprogrammed, replacement device with the same identification key as the device being replaced.

In the example in which the identification keys are initially provided (programmed) to the devices 12 by the theft deterrent function 52 of the central controller 40, an unprogrammed (i.e., blank) device can be installed into the system 10. During the next query by the central controller 40, the controller 40 determines the device is unprogrammed and does not have an identification key (and specifically does not have an erroneous key). The central controller 40 provides (programs) the new device with a key.

In the third example in which the theft deterrent function 52 of the central controller 40 "learns" the identification keys of the devices 12, replacement of a device 12 would require reactivation of the learn function of the theft deterrent function 52 by an authorized person.

From the above description of the invention, those skilled in the art will perceive improvements, changes, and modifications. For example, the theft deterrent function 52 can be performed by discrete circuitry. Such improvements, changes, and modifications within the skill of the art are intended to be covered by the appended claims.

Having described the invention, the following is claim:

1. A vehicle system having a plurality of components, said system comprising:
    control means for communicating with each of said components and for controlling actuation of said system in response thereto;
    said control means having means to discern an identity of each of said components, and means for determining whether the identity of each of said components corresponds to predetermined identification information and providing a signal indicative thereof.

2. A system as set forth in claim 1 wherein each of said components includes a memory that stores an identification key, which is the identity of the respective component.

3. A system as set forth in claim 2 wherein said control means includes a memory that stores at least one identification key, said means for determining includes means for comparing the identification key of each component with an identification key of said control means.

4. A system as set forth in claim 2 wherein said memory of each component is non-volatile.

5. A system as set forth in claim 2 wherein said memory of each component is programmable read-only memory.

6. A system as set forth in claim 1 wherein said plurality of components includes a plurality of actuatable, vehicle occupant restraint devices, said control means communicates with said plurality of restraint means and controls actuation of said plurality of restraint devices.

7. A system as set forth in claim 6 wherein said plurality of restraint devices includes an inflatable air bag device.

8. A system as set forth in claim 1 wherein said plurality of components includes a sensor for sensing a condition indicative of a vehicle crash and for providing a signal indicative thereof.

9. A system as set forth in claim 1, including means for recording information about each of said components which said control means determines does not correspond to said system in response to said indicative signal.

10. A vehicle occupant restraint system having an anti-theft feature, said system comprising:
    a restraint device actuatable for restraining a vehicle occupant, said restraint device having an identity associated with said system; and
    control means for communicating with said restraint device and for controlling actuation of said restraint device;
    said control means having means to discern the identity of said restraint device, and means for determining whether the identity of said restraint device corresponds to said system and providing a signal indicative thereof.

11. A system as set forth in claim 10 wherein said restraint device includes a memory that stores an identification key, the identification key is the identity of said restraint device.

12. A system as set forth in claim 11 wherein said control means includes a memory that stores an identification key of said control means, said means for determining includes means for comparing the identification key of said restraint device with the identification key of said control means.

13. A system as set forth in claim 11 wherein said memory of said restraint device is non-volatile.

14. A system as set forth in claim 11 wherein said memory of said restraint device is programmable read-only memory.

15. A system as set forth in claim 10, including means for providing an alert in response to said signal from said control means indicating that said restraint device does not correspond to said system.

16. A system as set forth in claim 15 wherein said means for providing an alert includes means for providing at least one of an audible or visual signal.

17. A system as set forth in claim 10, including means for recording information about said restraint device in response to said signal from said control means indicating that said restraint device does not correspond to said system.

18. A system as set forth in claim 10 wherein said restraint device is one of a plurality of actuatable restraint devices included in said system, each of said plurality of restraint devices has an identity associated with said system, said control means further communicates with said plurality of restraint means and controls actuation of said plurality of restraint devices, said control means includes means to discern the identity of each of said plurality of restraint means and for determining whether the identities of said plurality of restraint devices correspond to said system, and said signal provided by said control means is indicative of the determination regarding the identities of said plurality of restraint devices.

19. A system as set forth in claim 10, including a communication interconnection interconnecting said control means and said restraint device for conveying a control signal from said control means to said restraint device to cause actuation of said restraint device and an identity signal from said restraint device to said control means to provide the identity of said restraint device to said control means.

20. A system as set forth in claim 19, including sensor means for sensing a condition indicative of a vehicle crash and for providing a signal indicative thereof, said communication interconnection further interconnects said control means and said sensor means for conveying said signal from said sensor means to said control means.

21. A system as set forth in claim 10 wherein said restraint device is an inflatable air bag device.

22. A system as set forth in claim 10, including a device for sensing a condition and for providing a signal indicative thereof to said control means, said device for sensing having an identity associated with the system, said control means having means to discern the identity of said device for sensing and means for determining whether the identity of said means for sensing corresponds to said system.

23. A restraint device for a vehicle occupant restraint system having an anti-theft feature, said restraint device comprising:

actuatable restraint means actuatable for helping to restrain a vehicle occupant;

initiator means for initiating said actuatable restraint means;

identification retainer means for retaining an identity of the restraint device associated with the system; and communication means for communicating with a central controller of the system, including means for communicating to cause said initiator to initiate said actuatable means and means for communicating to provide the identity from said identification retainer means to the central controller for determination of whether the identity of said restraint device corresponds to the system.

24. A restraint device as set forth in claim 23 wherein said identification retainer means includes a memory that stores an identification key, the identification key is the identity of said restraint device.

25. A restraint device as set forth in claim 24 wherein said memory is non-volatile.

26. A restraint device as set forth in claim 24 wherein said memory is programmable read-only memory.

27. A restraint device as set forth in claim 23 wherein said restraint means includes an inflatable air bag and a source of inflation fluid.

28. A method for preventing theft of a component of a vehicle system having a plurality of components, said method comprising:

communicating with each of the components;

controlling actuation of the system in response to the communication;

discerning the identity of each of the components;

determining whether the identity of each of the components corresponds to predetermined identification information; and providing a signal indicative of the determination.

29. A method as set forth in claim 28, including storing an identification key in a memory of each component, the identification key is the identity of the respective component.

30. A method as set forth in claim 29, including storing at least one identification key in a memory of a controller, said step of determining includes comparing the identification key of each restraint device with an identification key of the controller.

31. A method as set forth in claim 28, including providing an alert in response to the signal indicative of the determination that at least one of the components does not correspond to the system.

32. A method as set forth in claim 28, including recording information about each of the components that it is determined does not correspond to the system.

33. A method for preventing theft of a restraint device that is actuatable for restraint of a vehicle occupant, the restraint device is part of a vehicle occupant restraint system that has a control means for communicating with the restraint device and for controlling actuation of the restraint device, said method comprising:

providing the restraint device with an identity associated with the system;

discerning the identity of the restraint device, via communication between the control means and the restraint device; and determining whether the identity of the restraint device corresponds to the system and providing a signal indicative thereof.

34. A method as set forth in claim 33, including storing an identification key in a memory of the restraint device, the identification key is the identity of the restraint device.

35. A method as set forth in claim 34, including storing an identification key in a memory of the controller, said step of determining includes comparing the identification key from the memory of the restraint device with the identification key from the memory of the controller.

36. A method as set forth in claim 33, including providing an alert in response to the indicative signal.

37. A method as set forth in claim 36 wherein said step of providing an alert includes providing at least one of an audible or visual signal.

38. A method as set forth in claim 33, including recording information about the restraint device in response to the indicative signal.

* * * * *